United States Patent [19]

Harben, Jr. et al.

[11] 4,024,603
[45] May 24, 1977

[54] LOW NOISE VACUUM LUNG MACHINE

[75] Inventors: Grover S. Harben, Jr., Gainesville; Kenneth Z. Graham, Dawsonville, both of Ga.

[73] Assignee: Gainesville Machine Company, Inc., Gainesville, Ga.

[22] Filed: Sept. 24, 1975

[21] Appl. No.: 616,258

Related U.S. Application Data

[63] Continuation-in-part of Ser. No. 217,206, Jan. 12, 1972, Pat. No. 3,908,229, and Ser. No. 430,209, Jan. 2, 1974, Pat. No. 3,902,221.

[52] U.S. Cl. .................................................. 17/11
[51] Int. Cl.² .......................................... A22B 3/08
[58] Field of Search .................................... 17/11

[56] References Cited

UNITED STATES PATENTS 3,137,031   6/1964   Ine .......................................... 17/11
3,803,669   4/1974   Dillon ...................................... 17/11

Primary Examiner—Robert Peshock
Attorney, Agent, or Firm—Newton, Hopkins & Ormsby

[57] ABSTRACT

A viscera removal apparatus for poultry having a preformed access opening to their body cavity including a conveying and positioning means for successively moving poultry along a prescribed path; a plurality of vacuum operated tool assemblies; carriage means for selectively moving the tool assemblies into the body cavities of the poultry through the access openings so that the operating ends thereof overlie the viscera to be removed; vacuum means for imposing a vacuum through the operating ends of the tool assemblies to withdraw the viscera; and muffler means for introducing ambient air into the body cavity to reduce the operating noise level. The method of operation is also contemplated.

25 Claims, 16 Drawing Figures

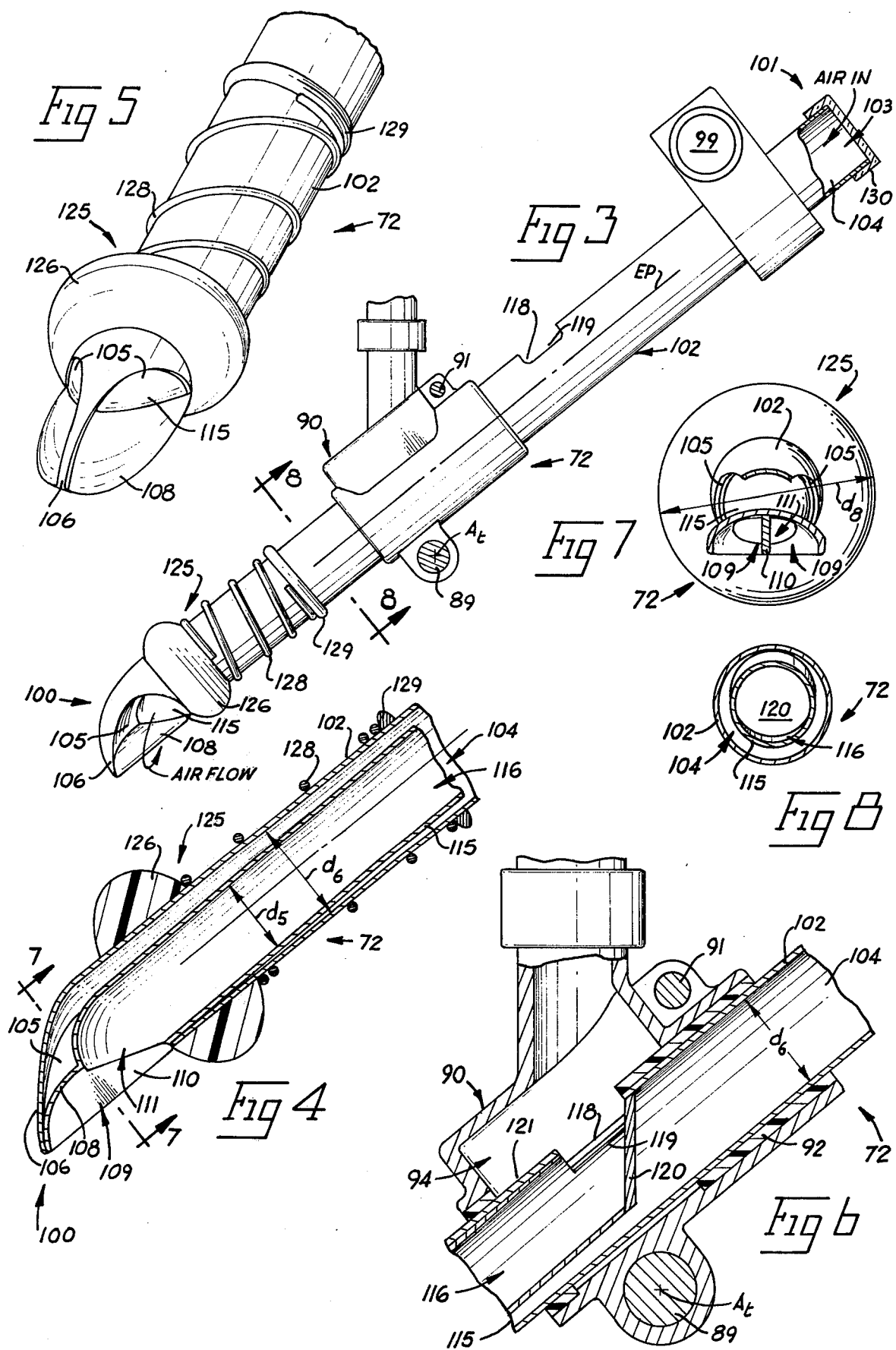

LOW NOISE VACUUM LUNG MACHINE

CROSS-REFERENCE TO RELATED APPLICATIONS

This application is a continuation-in-part of our co-pending applications, Ser. No. 217,206, filed Jan. 12, 1972 for "Vacuum Eviscerating Apparatus and method", now U.S. Pat. No. 3,908,229 and Ser. No. 430,209, filed Jan. 2, 1974 for "Eviscerator Apparatus and Method", now U.S. Pat. No. 3,902,224.

BACKGROUND OF THE INVENTION

Recently, the evisceration of poultry has been accomplished mechanically. The evisceration has generally been divided into two separate operations. A first operation removes the major portion of the viscera while certain organs, principally the lungs, are left in place. In a subsequent operation, the remaining organs such as the lungs are removed using a vacuum tool which is mechanically inserted into the body cavity of the poultry so that it overlies the particular organs to be removed whereupon these organs such as the lungs are withdrawn by a vacuum. One of the problems associated with this vacuum eviscerating operation is that a relatively high noise level is generated when the ambient air is drawn through the access opening of the poultry and into the vacuum tool to dislodge and remove the viscera. Not only is this noise level relatively high, it is further aggravated by the fact that it is generated at about the ear level of the personnel operating the poultry processing plant. This has resulted in objections by those governmental agencies responsible for noise level control to the use of this vacuum operated equipment.

Another problem that is associated with this vacuum eviscerating operation is that the use of a vacuum to withdraw the viscera has a tendency to remove any body part which happens to not be very firmly attached within the body cavity of the bird. One of the body parts that has caused the most concern is the layer of fat that is normally associated with the interior of the body cavity, especially at the preformed access opening formed at the vent. Frequently, the vacuum eviscerating tool removes not only the viscera intended to be removed but also this layer of fat results in an undesirable significant loss of edible body weight.

SUMMARY OF THE INVENTION

These and other problems and disadvantages associated with the prior art are overcome by the invention disclosed herein by providing noise level control means which both reduces the noise level presently associated with vacuum operated eviscerating machines and raises the distance above floor level in the processing at which any noise is generated well above ear level of the personnel operating the poultry processing plant. Provision is also made whereby those organs of the viscera remaining in the body cavity after the initial eviscerating operation has been completed can be removed without the danger of removing those body parts sought to be left in the body cavity. The noise level is reduced by providing an ambient air intake tube which extends into the body cavity and acts as a muffler through which outside air is introduced into the body cavity. The access opening to the body cavity is selectively sealed so that outside air is forcibly drawn into the body cavity through the intake tube and then drawn out of the body cavity through the vacuum tool to remove the viscera. That portion of the inside of the body cavity over which the eviscerating tool passes is covered by a protector to prevent removal of edible body parts while the tool is within the body cavity but the organs to be removed are left exposed for removal by the tool.

The apparatus of the invention includes generally an overhead conveyor which moves the poultry along a prescribed path while supporting the poultry by their hocks, an eviscerating tool assembly which is selectively extendable into the body cavity of the poultry through an access opening formed at the vent by a carriage assembly, positioning means for operating in conjunction with the overhead conveyor for locating the access opening of the poultry with respect to the eviscerating tool assembly, and a protector which is inserted into the body cavity of the poultry to overlie those edible body of the eviscerating tool assembly as it is extended into the body cavity to prevent the inadvertent removal of those edible body parts. The organs to be removed are left exposed for removal by the eviscerating tool. The eviscerating tool assembly includes a vacuum tool connected to a vacuum source with an open mouth at the projecting end of the tool assembly to be placed over the viscera in the body cavity to be removed by the vacuum, ambient air inlet means for introducing outside air into the body cavity through muffler means to reduce the operating noise level, and sealing means for selectively sealing the access opening about the tool assembly so that outside air is forcibly drawn into the body cavity through the intake tube and then out of the body cavity through the open mouth of the vacuum tool thereby removing the viscera therewith.

The method of the invention includes sealing the body cavity at the access opening; imposing a vacuum in the vicinity of the viscera to be removed from the body cavity while the access opening is sealed; and introducing ambient air into the body cavity from a point remote to the body cavity so that the introduced ambient air will be withdrawn from the body cavity by the vacuum removing the viscera therewith. The method of the invention further includes covering those body parts which are desired to be left within the body cavity and which underlie the path of insertion of an eviscerating tool passing into the body cavity so as to prevent the inadvertent removal of body parts which are desired to be left within the body cavity.

These and other features and advantages of the invention will become more fully understood upon consideration of the following detailed description and accompanying drawings wherein like characters of reference designate corresponding parts throughout the several views and in which:

BRIEF DESCRIPTION OF THE DRAWINGS

FIG. 3 is a side view of the eviscerating tool assembly of the invention taken substantially along line 3—3 in FIG. 1 with the tool assembly in its retracted position;

FIG. 4 is an enlarged longitudinal cross-sectional view of the operating end of the tool assembly of FIG. 3 with the tool assembly in eviscerating position;

FIG. 5 is a perspective view of the operating end of the tool assembly shown in FIG. 4 in its retracted position;

FIG. 6 is an enlarged longitudinal partial cross-sectional view of the tool assembly in its eviscerating position showing the vacuum connection;

FIG. 7 is a cross-sectional view taken along line 7—7 in FIG. 4;

FIG. 8 is a cross-sectional view taken along line 8—8 in FIG. 3;

These figures and the following detailed description disclose specific embodiments of the invention, however, the inventive concept is not limited thereto since it may be embodied in other forms.

DETAILED DESCRIPTION OF ILLUSTRATIVE EMBODIMENTS

Referring to the figures, it will be seen that the invention is incorporated in a vacuum eviscerating machine which is disclosed in our co-pending application Ser. No. 217,206 and which is incorporated herein by reference. The machine 10 is used in conjunction with and driven from an overlead conveyor 11 normally associated with poultry processing plants. The birds B are suspended on the conveyor 11 by their hocks and successively moved past the machine 10 along a prescribed path P seen in FIG. 1. The birds are successively engaged by positioning means 12 on the machine 10 which cooperates with the conveyor 11 to positively locate the preformed access opening in the birds while supporting the breast portion of the bird in cantilever fashion through the bone and muscle structure thereof for evisceration. An eviscerating means 14 of the machine 10 then extends vacuum eviscerating tool assemblies into the birds through the preformed access opening at their vents to remove selected viscera such as the lungs from the body cavity of the bird using a vacuum.

Figure 1:
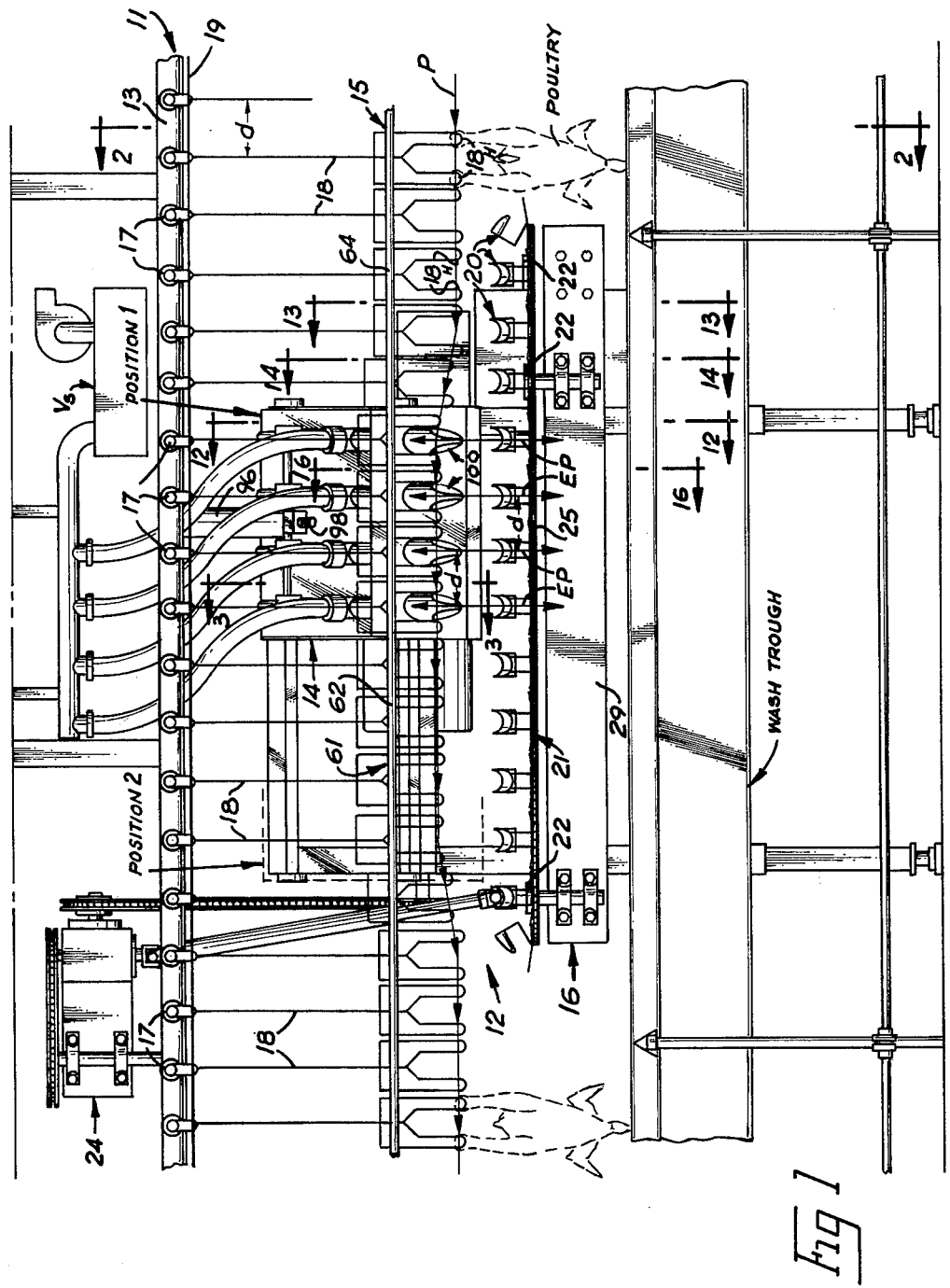
FIG. 1 is a front view of an eviscerating machine embodying the invention.
Figure 2:
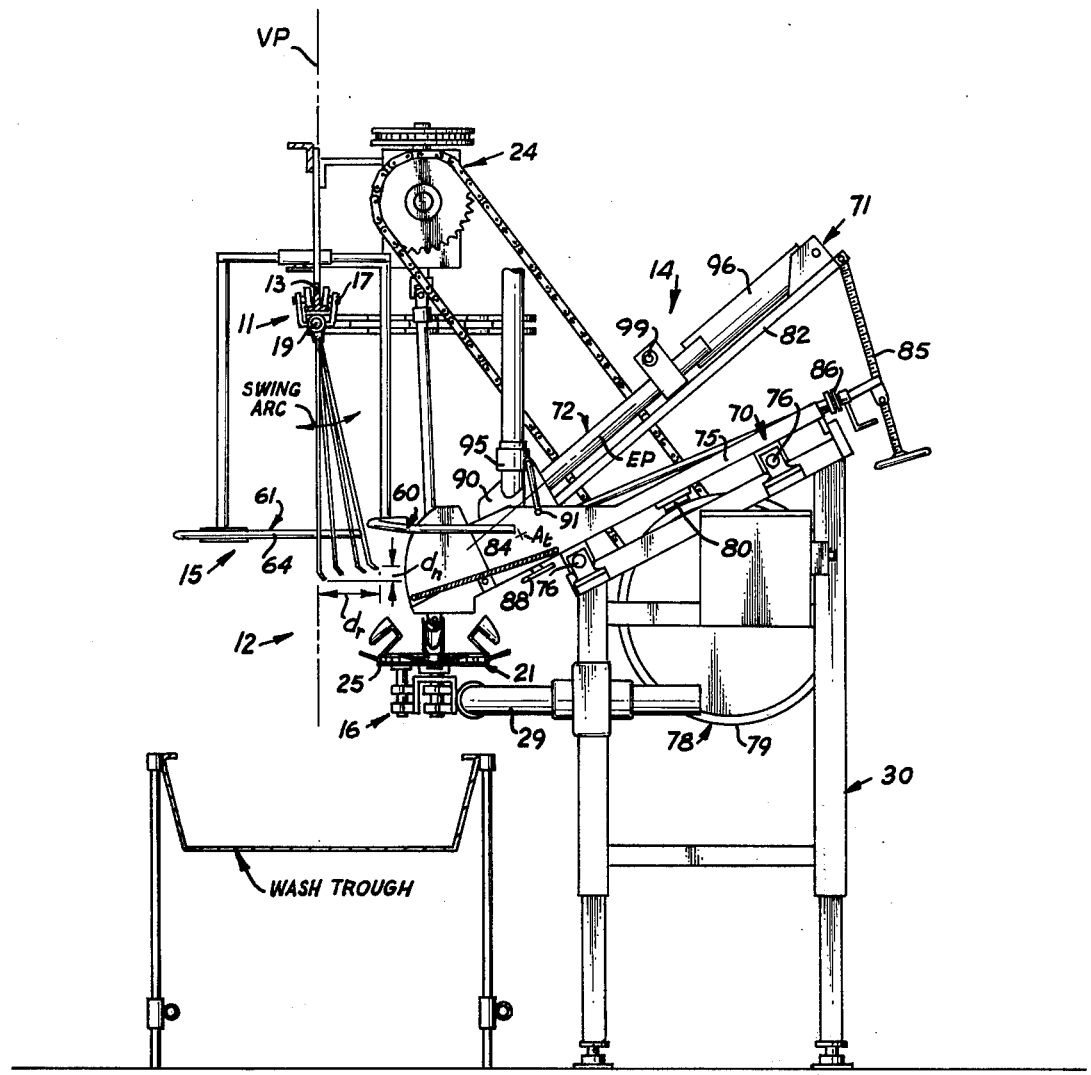
FIG. 2 is an entry end view of the machine taken along line 2—2 in FIG. 1.

The overhead conveyor 11 as seen in FIGS. 1 and 2 has an overhead track 13 which carries a plurality of wheeled trolleys 17 thereon. A shackle 18 is flexibly attached to each trolley so that its lower end which supports the hocks of the birds in a spaced apart condition can swing about an arc normal to a vertical plane VP through the track 13 as seen in FIG. 2. A drive member 19 such as a cable or chain connects each of the trolleys 17 and moves them along the track 13 from the right to the left in FIG. 1. This serves to move the birds B successively along the prescribed path P in a suspended head lowermost position with a longitudinal prescribed space $d$ therebetween as seen in FIG. 1. The flexible connection between the trolleys 17 and shackles 18 allow the poultry to swing laterally of plane VP with the space $d$ remaining the same while the birds are moved successively along path P as will become more apparent.

POSITIONING MEANS

The positioning means 12 seen in FIGS. 1 and 2 includes a guide assembly 15 which deflects the lower ends of shackles 18 on the conveyor 11 laterally with respect to the plane VP of track 13 and a holding assembly 16 which holds the birds in conjunction with the shackles on the conveyor 11 for evisceration. The holding assembly 16 includes a plurality of holding members 20 which are mounted on an endless support chain 21 drvingly mounted between sprockets 22 as seen in FIG. 1. One of the sprockets 22 is drivingly connected to the drive member 19 of the overhead conveyor 11 through an idler drive unit 24 so that the conveyor 11 drives the support chain 21 and holding members 20 in synchronization therewith as will become more apparent. The support chain 21 has a forward flight 25 as seen in FIGS. 1 and 2 which is oriented generally parallel to the prescribed path P along which the poultry is moved so that the forward flight 25 moves from the right to the left as seen in FIG. 1 synchronously with the movement of shackles 18. The chain 21 is an endless link chain provided with spaced apart locator tabs 26 best seen in FIG. 12 that ride along a guide 28 behind the forward flight 25 of chain 21 to orient the forward flight of chain 21. The sprockets 22 and guide 28 are carried by an appropriate support frame 29 which is adjustably mounted on the main machine frame 30 as best seen in FIG. 2. This allows the support frame 29 to be adjusted to properly orient the forward flight 25 of the support chain 21 as will become more apparent.

Figure 9:
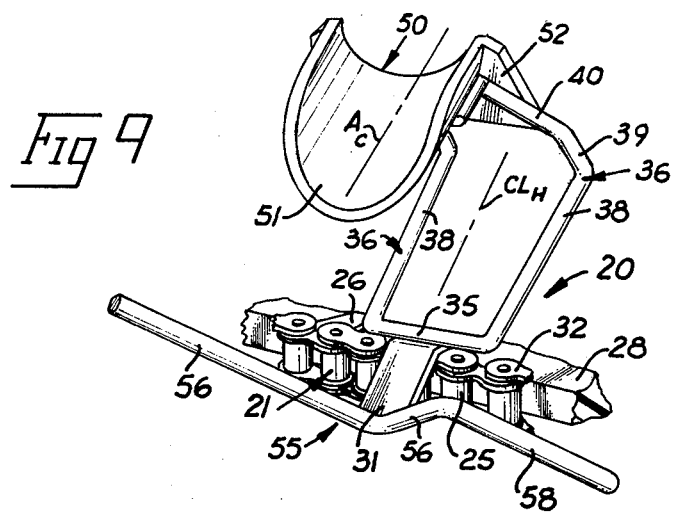
FIG. 9 is a perspective view of a holding member of the machine of FIGS. 1 and 2 embodying the invention.

Each of the holding members 20 as best seen in FIG. 9 includes a main body 31 which is attached to and carried by certain of the links 32 in chain 21. The holding members 20 are spaced apart the same prescribed distance $d$ as seen in FIG. 1 as the distance $d$ between the shackles on the conveyor 11 and the connection between the conveyor 11 and the sprockets 22 through idler drive unit 24 is such that one of the holding members 20 will be vertically aligned with each of the shackles 18 on the overhead conveyor as the shackles pass along the forward flight 25 if the support chain 21. The main body 31 of each of the holding members 20 is attached to the links 32 so that the main body 31 defines an angle $A_1$ with respect to the plane of the edge of the chain 21 as best seen in FIG. 12.

Figure 10:
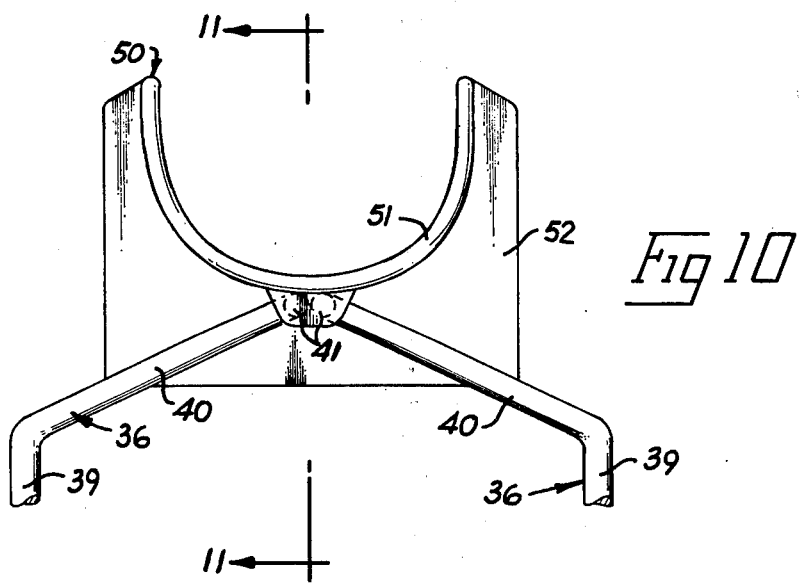
FIG. 10 is an enlarged front view of the protector of the invention seen in FIG. 9.
Figure 11:
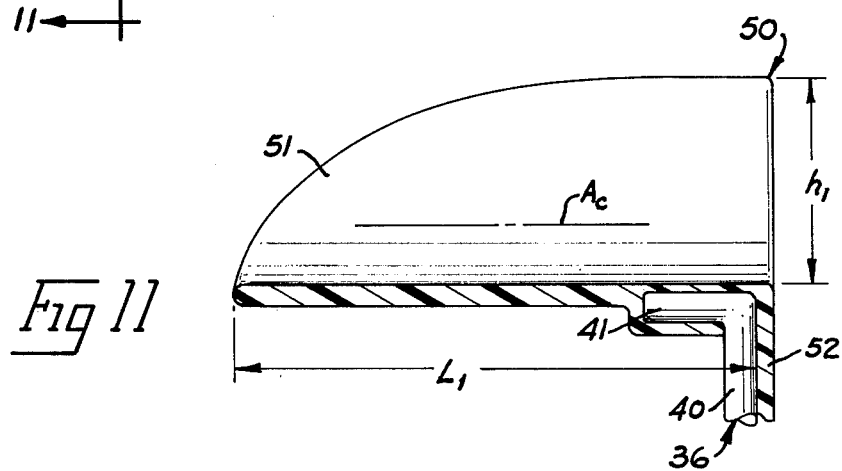
FIG. 11 is a longitudinal cross-sectional view of the protector taken along line 11—11 in FIG. 10.
Figure 12:
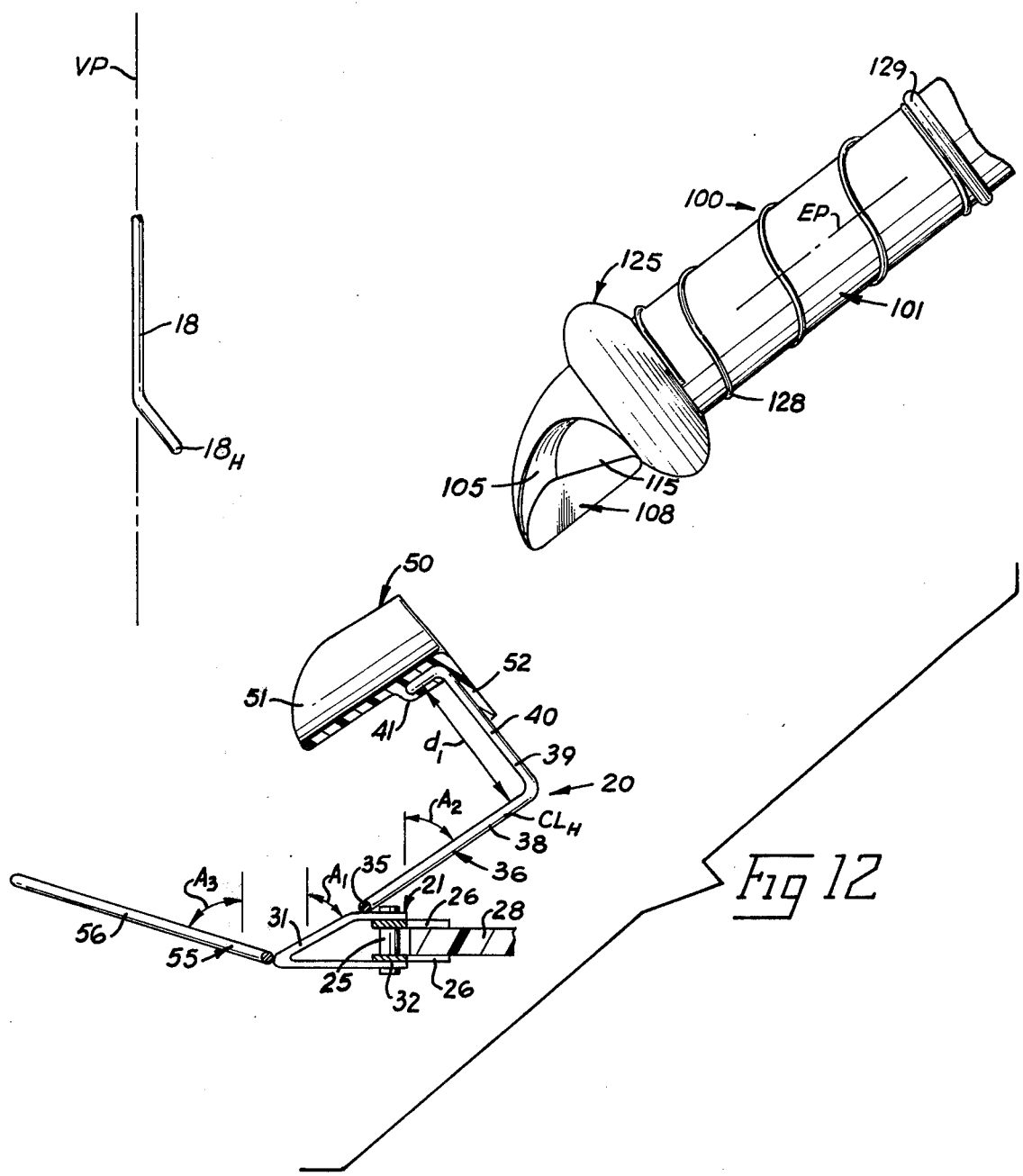
FIG. 12 is an enlarged view taken generally along line 12—12 in FIG. 1 showing the inter-relationship between the parts of the machine.

Referring now to FIGS. 9–11, each of the holding members 20 further includes a U-shaped rod yoke 34 which extends upwardly from the upper end of body 31 at an angle $A_2$ seen in FIG. 12 with respect to the plane of the edge of chain 21. The yoke 34 includes a central section 35 which is attached to the upper end of body 31 with a pair of spaced apart legs 36 extending rearwardly and upwardly from the central section 35. Each of the legs 36 has a lower section 38 which is generally parallel to the centerline $CL_H$ of the holding member 20 lying at angle $A_2$ seen in FIGS. 9 and 12 with an upwardly extending portion 39 at the rear end of the lower portion 38 which is arranged generally perpendicular to the lower portion 38 and lies generally in the same vertical plane as the lower portion 38. The projecting ends of the upwardly extending portions 39 of legs 36 are provided with inwardly angled portions 40 that extend inwardly toward each other above the centerline $CL_H$. The upper ends of the inwardly angled portions 40 are provded with forwardly extending hook projections 41 that extend back over the plane of the lower portion 38 generally parallel thereto and spaced thereabove a prescribed distance $d_1$ best seen in FIG. 12. Thus, it will be seen that each of the hook projections 41 on the legs 36 lie adjacent each other and are centered over the centerline $CL_H$ of the holding member 20. The hook projections 41 are designed to be inserted into the access opening at the vent of the bird in opposition to the shackles 18 of the overhead conveyor 11 to positively hold the access opening while allowing the breast portion of the bird to be flexibly supported in cantilever fashion therefrom through its bone and muscle structure as will become more apparent.

A protector member 50 as best seen ifn FIGS. 9–11 is carried on the hook projections 41 and extends forwardly thereover. The protector member 50 includes a cavity cover portion 51 and a reinforcing leg 52. The cavity cover portion 51 is arcuate in shape so that it will fit into and conform to that portion of the inside of the body cavity of the bird adjacent the backbone between the viscera to be removed, illustrated in FIGS. 13–16 as the lungs, and the access opening at the rear end of the bird. It will be noted that the cover portion 51 has a length $L_1$ and a height $H_1$ so that when the cover portion 51 is inserted into the body cavity through the access opening, the cover portion 51 overlies that portion of the inside of the body cavity between the lung cavity and the rear end of the bird to cover that portion of the inside of the body cavity over which the eviscerating tool assembly passes as it moves to a position overlying the lung cavities. The central axis $A_C$ of the cover portion 51 is generally parallel to the axis of the hook projections 41 and the centerline $CL_H$ of the main body 31. The hook projections 41 are attached to the lowermost portion of the cover portion 51 as seen in FIG. 11 through a connector 53 on the protector member 50. The reinforcing leg 52 extends downwardly from and is joined to the rear end of the cover portion 51 as seen in FIGS. 10 and 11. The reinforcing leg 52 lies behind and is attached to the inwardly angled portions 40 of the legs 36 of holding member 20 to overlie the rear end of the bird adjacent the access opening so as to prevent any edible body parts from being inadvertently removed during the evisceration operation.

The protector member 50 may be made out of a number of materials such as rubber, plastic or metal with plastic being illustrated. If the material is resilient as is the case with rubber or plastic, the cavity cover portion 51 may more easily conform to the variations in shape of the inside of the body cavity and also not damage the eviscerating tool assembly if it is struck thereby. It will aslo be understood that member 50 may be solid as illustrated or a perforate member without departing from its use.

A V-shaped back support yoke 55 is attached to the lower end of the body 31 of the holding member 20 at its bight with diverging legs 56 extending forwardly and upwardly from the body 31 so that the yoke 55 defines an included angle $A_3$ with the plane of the edge of the support chain 21 as seen in FIG. 12. The distance between the outer ends of legs 56 is sufficient to span the back of the bird as will become more apparent. The outer end of the trailing leg 56 is provided with a rearwardly curved projection 58 as seen in FIG. 9 which is adapted to overlie the leading end of the next adjacent yoke 55 to guide the birds to a position so that the protector member 50 can project into the access opening as will become more apparent.

The guide assembly 15 includes a rear guide rod 60 and front guide rod 61 that respectively lie behind and in front of the lower ends of the shackles 18 as they are moved by the conveyor past the eviscerating machine 10 so that the hock engaging portions of the lower ends of the shackles 18 are swung rearwardly and upwardly as the shackle enters the machine 10 and then allows the shackles to swing forwardly and downwardly as the shackle leaves the machine 10 to cause the bird to be engaged by the holding members 20 during passage of the bird B through the machine 10 as seen in FIGS. 1 and 2. The front guide rod 61 has a central section 62 which is arranged generally parallel to the path P along which the birds are moved but is displaced rearwardly of the vertical plane VP extnding through the conveyor track 13 so that the curved portions at opposite ends of rod 61 that extend forwardly of the vertical plane VP deflect the lower ends of the shackles 18 rearwardly as they enter the machine and allow the shackles to be moved forwardly as they exit the machine.

Figure 13:
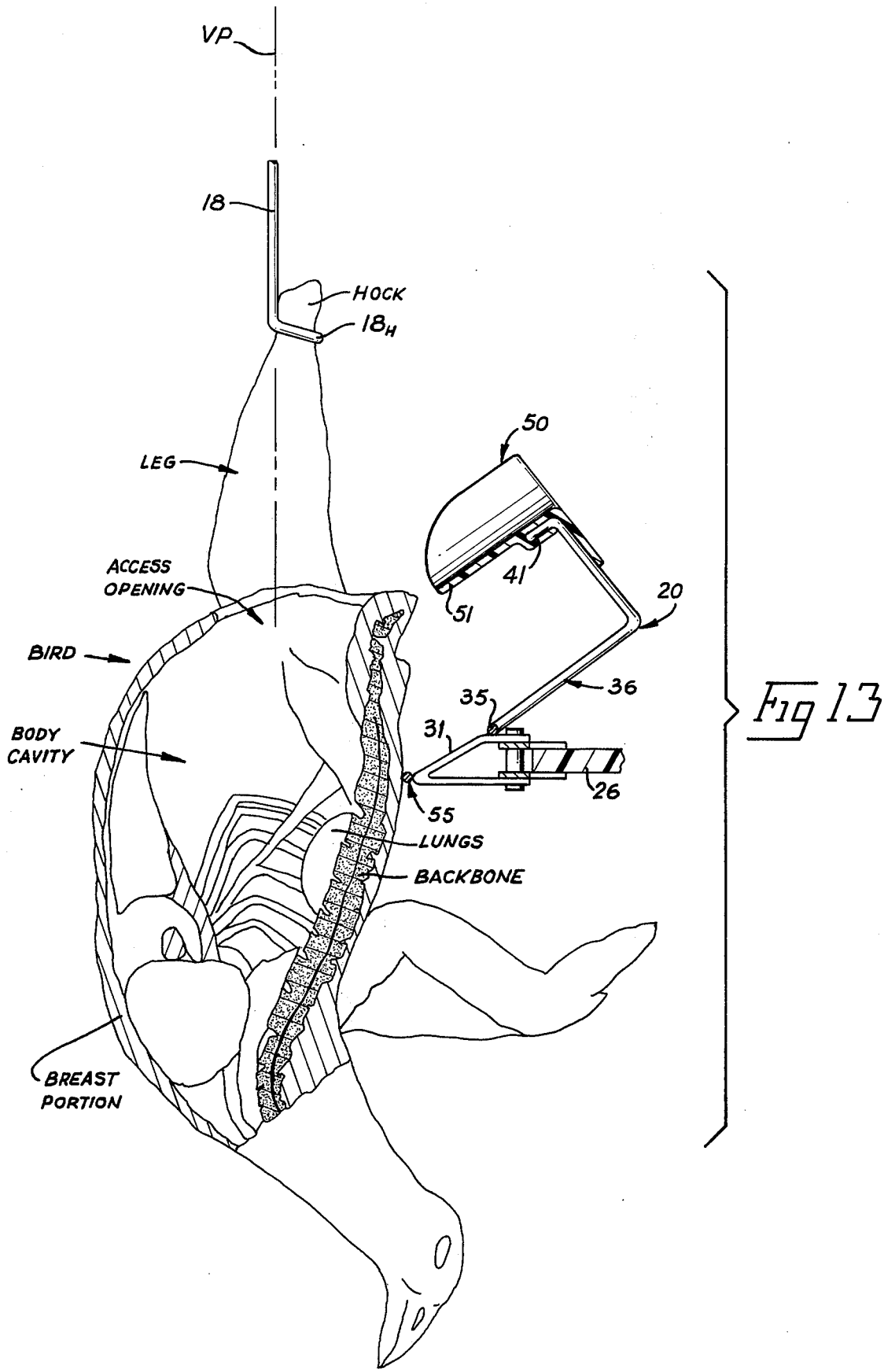
FIG. 13 is an enlarged view taken along line 13—13 in FIG. 1 showing a bird ready for positioning by the invention.
Figure 14:
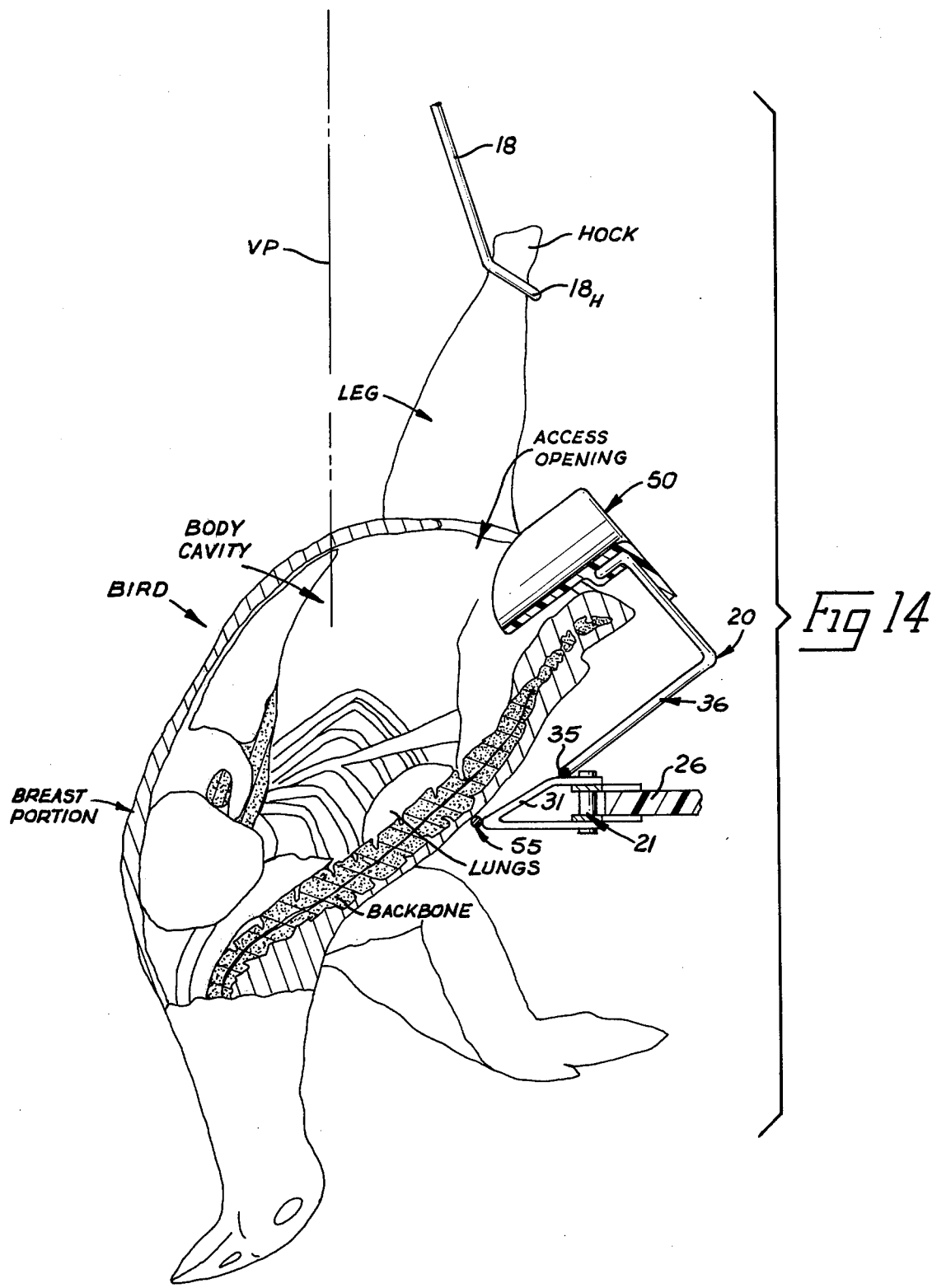
FIG. 14 is an enlarged view taken along line 14—14 in FIG. 1 showing the bird being positioned by the invention.
Figure 15:
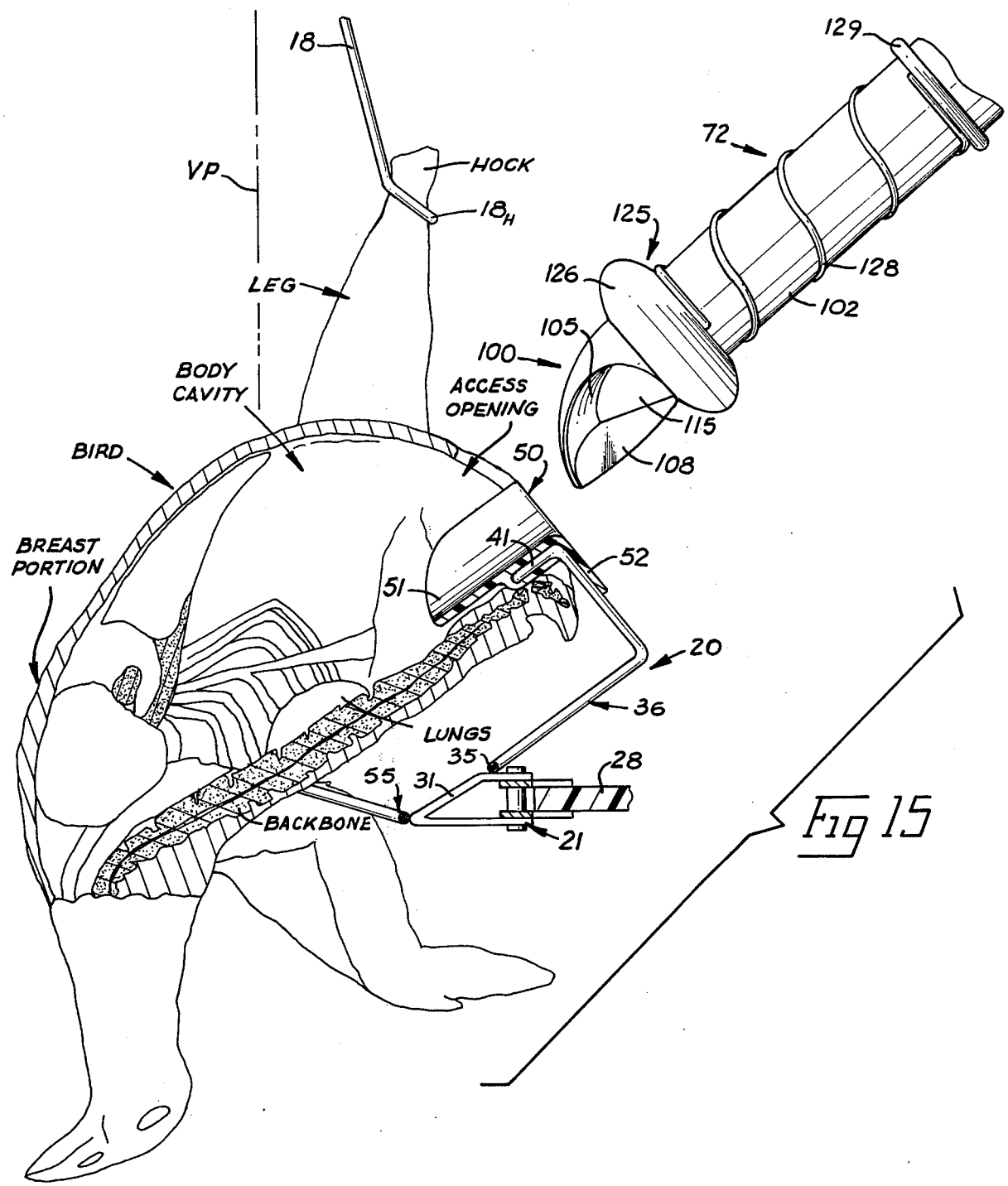
FIG. 15 is an enlarged view taken along line 12—12 in FIG. 1 showing the invention positioning a bird ready for evisceration; and, FIG. 16 is an enlarged view taken along line 16—16 in FIG. 1 showing the bird being eviscerated.

In the operation of the positioning means 12, then, it will be seen that the birds are supported through their hocks by the hock engaging portions $18_h$ of the shackles 18 that hold the legs in a spaced apart condition where the birds hang in a head lowermost position and are moved along the prescribed path P as seen in FIG. 1. It will further be noted that the back of the bird faces the machine 10 as the shackle with the bird therein approaches the machine 10. As the shackle member 18 carrying a bird approaches the mchine 10, one of the holding members 20 is synchronously moved to a position behind the bird and into alignment wherewith as illustrated in FIG. 13. This holding member 20 will remain in alignment with and be moved synchronously with the shackle member 18 as the holding member 20 moves along the forward flight 25 of the support chain 21 as seen in FIG. 1. As the bird continues to be moved toward the machine 10 the curved portion 64 seen in FIG. 2 on the front guide rod 61 deflects the lower hock engaging portions of the shackle 18 and the bird rearwardly so that the shackles swing about an arc to cause the bird carried thereby to be moved rearwardly a distance $d_r$ and upwardly a distance $d_h$ as seen in FIG. 2. This causes the bird to be moved from the position shown in FIG. 13 through the position seen in FIG. 14, to the position shown in FIG. 15 as will be described. Initially, the V-shaped back support yoke 55 of the holding member 20 associated with the particular shackle 18 carrying the bird is positioned behind the back of the bird and engages the back of the bird below its leg joints. As the guide rod 61 deflects the shackle member 18 upwardly and rearwardly with respect to the holding member 20, the relative movement between the shackle member 18 and yoke 55 causes the body of the bird to be pivoted about its leg joints as seen in FIG. 14. This pivoting movement causes the access opening in the bird to align with the hook projections 41 and the protector member 50 so that as the front guide rod 61 continues to swing the shackle rearwardly and upwardly, the bird will be moved rearwardly and upwardly while the yoke 55 maintains the bird in the pivoted position to cause the protector member 50 and hook projections 41 to extend into the access opening as seen in FIG. 14. As the curved portion 64 continues to swing the bird rearwardly and upwardly, the rear end of the bird is lifted and pulled back against the angle portions 40 of the yoke 34 as well as up against the hook projections 41 of th yoke 34. This causes the hook projections 41 and protector member 50 to engage the access opening in opposition to the shackle member so that the body of the bird is swung upwardly through the joints between its legs and body to lift the back of the bird off of the support yoke 55 of the holding member 20 and cause the bird to be supported between its hocks in the shackle 18 and the access opening at the hook projections 41 and the protector member 50. The breast portion of the bird is now supported solely through its bone and muscle structure in cantilever fashion as seen in FIG. 15. This allows the breast portion of the bird to be flexibly moved with respect to the access opening at the rear end of the bird without significant movement of the access opening.

By this time, the shackle member 18 has reached the central portion 62 of the front guide rod 61 so that the access opening is held in and passes along a relatively fixed plane FP while relative movement of the breast portion of the bird is allowed with respect thereto. Because the access opening is now located in the fixed plane FP, it is a relatively easy manner to mechanically insert the eviscerating tool assembly through the access opening. It will also be noted that at this time, the cavity cover portion 51 of the protector member 50 has been forced down against the inside of the body cavity of the bird and that the cover portion 51 overlies that portion of the body cavity of the bird adjacent the backbone between the lung cavity and the access opening while the reinforcing leg 52 covers the rear end of the bird. In this position, it will be seen that the eviscerating tool assembly can be inserted into the body cavity of the bird over the protector member 50 without any danger of removing body parts which lie under the protector member 50. It will also be noted that the lungs which lie in the lung cavity are exposed so that the tool assembly can be moved into position overlying the lungs and withdraw the lungs as will become more apparent.

EVISCERATING MEANS

As best seen in FIGS. 1 and 2, the eviscerating means 14 includes a carriage table assembly 70 reciprocally mounted on the main machine frame 30 for reciprocal movement along a table path TP seen in FIG. 1 generally parallel to the prescribed path P, a tool support assembly 71 mounted on the table assembly 70 and reciprocally moved therewith along the table path TP, and a plurality of eviscerating tool assemblies 72 reciprocally mounted by the tool support assembly 71 for movement along eviscerating paths EP generally normal to the prescribed path P. Therefore, it will be seen that the tool assemblies 72 can be reciprocated along the eviscerating paths EP while moving along the table path TP with the support assembly 71.

The carriage table assembly 70 includes a generally rectilinear carriage table 75 which is reciprocally mounted on the main machine frame 30 by a pair of spaced apart support rods 76 seen in FIG. 2. The carriage table 75 is reciprocally driven along the support rods 76 along the table path TP parallel to the presecribed path P by a cam drive assembly 78. The cam drive assembly 78 has an annular cam with a camming surface thereon which operatively engages a cam follower 80 attached to the bottom of the table. The cam 79 is in turn driven by the idler drive unit 24 so that the reciprocation of the table 75 along the support rods 71 is synchronized with the movement of the shackle members through the machine 10. This construction and its operation are more clearly explained in our application Ser. No. 217,206 and incorporated herein by reference.

The tool support assembly 71 includes a tool subframe 82 pivoted at its forward end at the forward edge of the carriage table 75 between upstanding supports 84 seen in FIG. 2 on table 75 by a shaft 89 seen in FIG. 3 about a pivot axis $A_t$ which lies generally parallel to the prescribed path P. The opposite rear end of the tool subframe 82 is supported by an angle adjustment mechanism 85 as seen in FIG. 2 which connects the subframe 82 to the rear side of the carriage table 75 so that the subframe 82 can be selectively pivoted about the axis $A_t$. The pivot axis $A_t$ of shaft 89 can be moved toward and away from the prescribed path P by an appropriate projection adjustment mechanism 86 also seen in FIG. 2 and can be raised and lowered by an appropriate height adjustment mechanism 88. The specific structure and operation of the pivotal connection between the subframe 82 and table 75 and the adjustment thereof are more clearly described in our copending application Ser. No. 430,209 and incorporated herein by reference.

The tool support assembly 71 also includes a plurality of connector guides 90 best seen in FIGS. 3 an 6 which are pivotally mounted on the pivot shaft 89 and maintained in longitudinally spaced apart positions on shaft 89 by a lateral adjustment mechanism 91 shown in FIG. 2 and partly seen in FIGS. 3 and 6. While different numbers of connector guides may be used, four are illustrated. One connector guide is associated with each tool assembly 72 as will be more fully explained. As seen in FIG. 6, each connector guide includes a tool guide passage 92 therethrough which is centered on an eviscerating path EP and slidably mounts one of the eviscerating tool assemblies 72 therein as will become more apparent. The connector guide 90 also includes a valve passage 94 therein which opens into the guide passage 92 at one end and is connected to a vacuum source VS seen in FIG. 1 through a connector 95 seen in FIGS. 2 and 3. The valve passage 94 coopeates with the eviscerating tool assembly to impose a vacuum therethrough as will be explained.

The support assembly 71 also includes a fluid cylinder 96 as seen in FIGS. 1 and 2 connected to the rear side of subframe 82 with its piston rod 98 extending forwardly therefrom. The centerline of cylinder 96 and piston rod 98 is oriented generally parallel to the eviscerating paths EP. The forwardly projecting end of piston rod 98 mounts a drive crossbar 99 thereon oriented generally normal to the eviscerating paths EP to which the eviscerating tool assemblies are attached so that as the piston rod 98 is extended and retracted, the eviscerating tool assemblies will be reciprocated in the connector guides 90 along the eviscerating paths EP as will become more apparent.

Referring to FIGS. 1 and 2, it will be seen that there are a plurality of eviscerating tool assemblies 72, one being mounted in each connector guide 90. While four tool assemblies 72 are illustrated, it will be understood that this number may be varied as required to complete the vacuum evisceration operation as will become more apparent.

Referring to FIGS. 3 and 6, each eviscerating tool assembly 72 is slidably mounted in the guide passage 92 through the connector guide 90 with its operating end 100 projecting forwardly of the connector guide 90 toward the holding assembly 16. The rear end 101 of the tool assembly 72 is attached to the cross bar 99 to be reciprocated thereby. The longitudinal axis of the eviscerating tool assembly 72 is aligned along one of the eviscerating paths EP. Thus, it will be seen that as the cross bar 99 is reciprocated by the piston rod 98 of the fluid cylinder 96, the eviscerating tool assemblies 72 will be simultaneously reciprocated along their associated eviscerating paths EP.

Each of the eviscerating tool assemblies 72 comprises an intake support tube 102 which defined an air passage 104 therethrough which is open at the rear end 101 of the eviscerating tool assembly 72 to define an air intake opening 103. That end of the intake support tube 102 at the operating end 100 of the assembly 72 is provided with pair of air outlet cutouts 105 and an arcuate connecting tang 106 between the cutouts 105.

A vacuum nozzle assembly 108 is mounted in that end of the intake support tube 102 at the operating end 100 of assembly 72 as best seeen in FIGS. 4 and 7. The vacuum nozzle assembly 108 defines an open mouth 109 which opens in a generally downwardly direction and lies in a plane generally parallel to the eviscerating path EP. This open mouth 109 is sized to fit over the lung cavity area in the body cavity of the bird and is divided by a central baffle 110 which is located to separate the mouth into two submouths. The baffle 110 lies generally in a plane normal to the plane of the open mouth 109 and in vertical alignment with the eviscerating path EP. The vacuum nozzle assembly 108 also has an air and lung outlet 111 on the rear upper portion thereof so that when the open mouth 109 of the nozzle assembly 107 is placed over the lungs in the lung cavities in the bird, air can be drawn in through the open mouths 109 and pass out of the air and lung outlet 111. This causes the lungs to be loosened from the lung cavities and drawn into the nozzle assembly 108 through the open mouth 109 and pass out of the nozzle assembly 108 through the air and lung outlet 111 along with the air flowing therethrough.

A vacuum interconnect tube 115 defining a central passage 116 therethrough is positioned inside of the intake support tube 102 and connected to the vacuum nozzle assembly at the air and lung outlet 111 as seen in FIG. 4 so that the air and lungs passing out of the air and lung outlet 111 can pass along the central passage 116 in the interconnect tube 115. It will be noted that the vacuum interconnect tube 115 has a smaller outside diameter $d_5$ than the inside diameter $d_6$ of the air passage 104 through the intake support tube 102. It will further be noted that the intake support tube 102 is provided with a valve opening 118 seen in FIGS. 4 and 6 located in the intake support tube 102 so that the opening 118 is in registration with the intake opening 121 to passage 94 in the connector guide 90 when the vacuum nozzle assembly 108 overlies the lung cavity area of the bird as will become more apparent. The lower end of the vacuum interconnect tube 115 connected to the vacuum nozzle assembly 108 is located so that the vacuum interconnect tube 115 lies against the lower portion of the intake support tube 102 at the operating end 100 of assembly 72 as seen in FIG. 4.

The vacuum interconnect tube 115 then angles upwardly across the air passage 104 through the intake support tube 102 so that the upper end of the vacuum interconnect tube 115 lies against the upper portion of the intake support tube 102 at the valve opening 118 as seen in FIG. 6. The upper end of the vacuum interconnect tube 115 is provided with a discharge opening 119 in registration with the valve opening 118 through the intake support tube 102. The upper end of the vacuum interconnect tube 115 is welded to the inside of the intake support tube 102 so as to provide a seal between tubes 102 and 115 about the discharge opening 119 and valve oepning 118. The upper end of the central passage 116 in the vacuum interconnect tube 115 is closed by an end plate 120 as seen in FIG. 6. It will thus be seen that, because the diameter of the vacuum interconnect tube 115 is smaller than the diameter of the air passage 104 through the intake support tube 102, a sufficient space is left around the vacuum interconnect tube 115 so that the air passing down the air passage 104 from the intake opening 103 at the rear end of the intake support tube 102 is deflected around the vacuum interconnect tube 115 and passes out into the body cavity of the bird through the air outlet cutouts 105. This not only reduces the noise generated by the inflow of air through passage 104 but also serves to block the noise caused by the air being drawn into the vacuum nozzle assembly 108 as it passes upwardly through the intake passage 104. When the vacuum imposed on the open mouth 109 of the vacuum nozzle assembly 108 through the openings 118 and 119 and the tube 115, the air will be drawn in through the intake support tube 102, sweep around the ouside of the nozzle assembly 108 and be drawn into the open mouth 109 of the nozzle assembly while at the same time exerting a sufficient force on the lungs in the lung cavity to sweep the lungs into the open mouth 109 and subsequently out through the vacuum interconnect tube 115 and the openings 118 and 119 aligned with the intake opening 121 to the vacuum passage 94.

A sealing assembly 125 as seen in FIGS. 3–5 is carried on the intake support tube 102 adjacent the operating end 100 of the eviscerating tool assembly 72 and serves to selectively seal the access opening to the body cavity in the rear end of the bird about the tool assembly 72. This prevents ambient air from being drawn into the body cavity of the bird through the access opening when the vacuum is imposed therein and also prevents the noise generated as the air is drawn into the open mouth 109 of nozzle assembly 108 from eminating from the body cavity through the access opening. The sealing assembly 125 includes an annular plastic sealing collar 126 with an outside diameter $d_8$ larger than the access opening in the bird. The collar 126 has a central passage therethrough so that the collar 126 is slidably carried on the intake support tube 102. The collar 126 is urged toward the operating end 100 of the tool assembly 72 by a coil spring 128 about the tube 102 having its distal end away from the collar 126 positioned with an appropriate adjustably positioned set collar 129. The motion of the collar 126 toward the operating end 100 of the tool assembly 72 is limited by the forward edge of the collar 126 abutting the rear end of the nozzle assembly 108.

Because the vacuum interconnect tube 115 extends across the air passage 104 through the support tube 102, the vacuum interconnect tube acts as a muffling baffle for the incoming air to reduce the noise level generated by the inrush of air into the body cavity of the bird. Further, because the sealing assembly 125 seals the access opening of the bird about the tool assembly 72, the noise generated as the air is sucked into the open mouth 109 of the vacuum nozzle assembly 108 is insulated from the operating personnel of the processing plant. Further, an appropriate filter media 130 may be placed over the intake opening 103 to the air passage 104 as seen in FIG. 3 to filter the air passing down through the intake support tube 102 and into the body cavity of the bird.

In operation of the eviscerating means 14, it will be noted that the carriage table assembly 70 along with the tool support assembly 71 and eviscerating tool assemblies 72 are located at their receiving or rightmost position labelled Position 1 in FIG. 1 when the number of birds corresponding to the number of eviscerating tool assemblies 72 positioned between the shackle members and holding members 20 as shown in FIG. 15 become vertically aligned with the tool assemblies 72. At the time the tool assemblies 72 align with the birds, the drive cam assembly 78 starts moving the carriage table assembly 70 toward the discharge or left hand end of the machine as seen in FIG. 1 along the table path TP synchronously with the movement of the birds so that the tool assemblies 72 remain aligned with the corresponding birds until the carriage table assembly 70 reaches its discharge or left most position labelled Position 2 in FIG. 1. The left hand end of the carriage table 75 at Position 2 is partly shown in dashed lines in FIG. 1. The eviscerating tool assemblies 72 are reciprocated along the eviscerating paths EP to complete the vacuum evisceration operation as the carriage table assembly moves between Position 1 and Position 2.

When the birds align with the tool assemblies at Position 1, the operating end 100 of each of the eviscerating tool assemblies 72 is in its retracted position shown in FIG. 15. This maintains the openings 118 and 119 in each of the eviscerating tool assemblies 72 out of registration with the opening 121 in each of the connector guides 90 as seen in FIG. 3 so that no vacuum is being drawn on the open mouth 109 of each of the vacuum nozzle assemblies 108.

Figure 16:
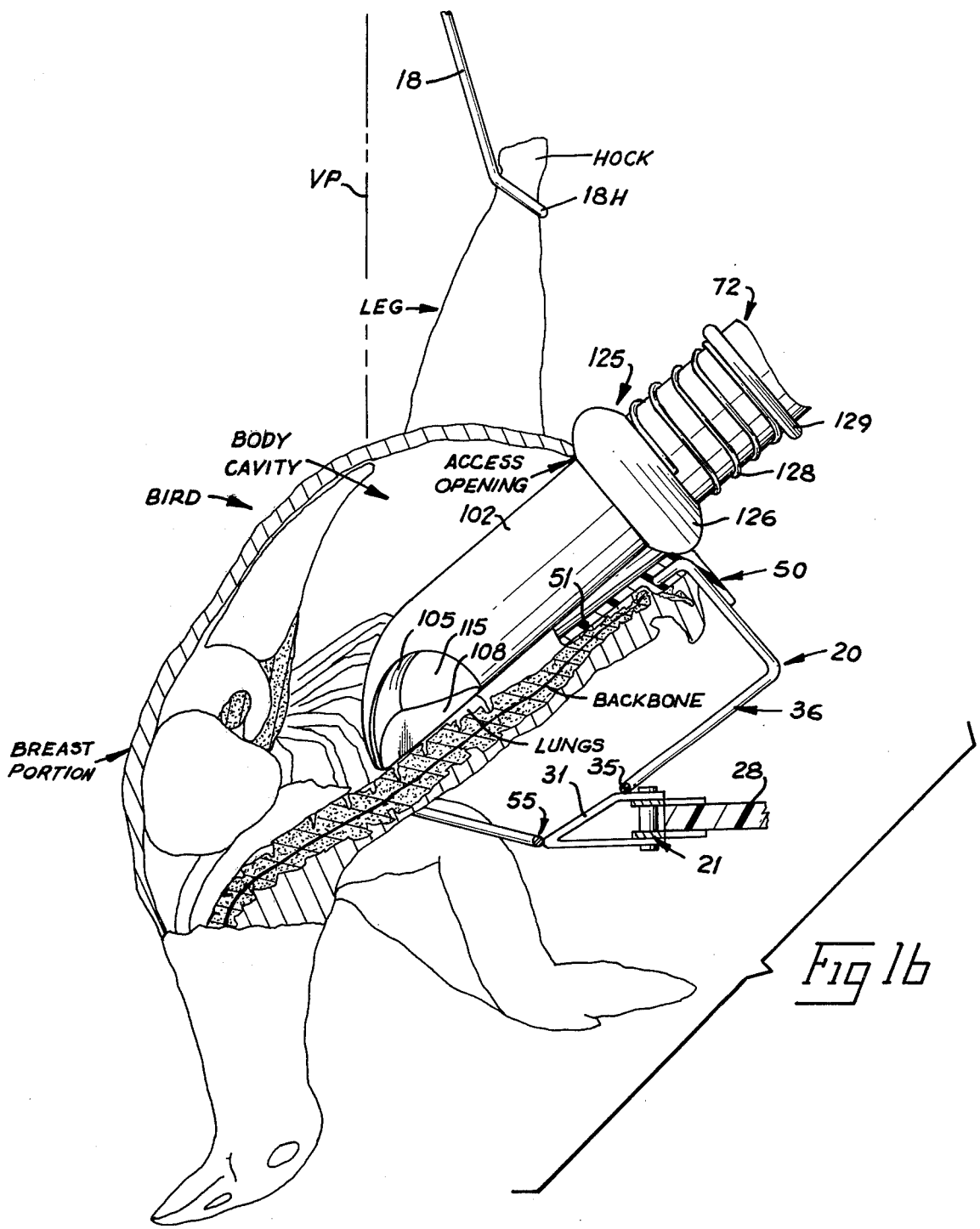

With each of the birds positioned as seen in FIG. 15 between the holding members 20 and shackle members 18, the fluid cylinder 96 is activated to extend the operating end 100 of each of the tool assemblies 72 toward the bird aligned therewith while the table assembly 70 moves the tool assemblies along the table path TP. It will be seen that appropriate adjustments are made so that the operating end 100 of each of the tool assemblies 72 passes through the access opening in each of the birds and into the body cavity over the protector member 50. Adjustments have also been appropriately made so that the open mouth 109 of each of the vacuum nozzle assemblies 108 will overlie the lungs in the body cavity of the associated bird as seen in FIG. 16 when the piston rod 98 reaches the end of its troke. As the operating end 100 of each of the tool assemblies 72 extends into the body cavity, it will further be seen that the sealing collar 126 under the influence of spring 128 engages the rear end of the bird about the access opening along with the protector member 50 so that the body cavity is now sealed at the access opening. When the operating end 100 of the tool assembly 72 reaches the position shown in FIG. 16, it will be noted that the openings 118 and 119 in the tool assembly 72 align with the intake opening 121 in the connector guide 90 as seen in FIG. 6. This serves to connect the vacuum from the vacuum source VS through the vacuum interconnect tube 115 to open mouth 109 in the vacuum nozzle assembly 108. Thus, it will be seen that the body cavity of the bird will be drawn through the open mouth 109 while additional air will be drawn into the bird cavity of the bird through the intake support tube 102. The air passing into the mouth 109 causes the lungs to be withdrawn from their cavities through the vacuum nozzle assembly 108, the vacuum interconnect tube 115, the passage 94 in connector guide 90 and then out to a remote location by the vacuum source VS. Each of the tool assemblies 72 may be reciprocated back and forth a short distance along the paths EP as the vacuum is imposed to assist in loosening the lungs for withdrawal.

After the lungs have been withdrawn, the operating ends 100 of the tool assemblies 72 are retracted froam the body cavity of the bird by retracting the piston rod 98 of cylinder 96. The tool assemblies 72 are retracted before the table assembly 70 reaches its leftmost position 2 seen in FIG. 1. The positioning means 12 then releases the birds and allows them to pass out of the discharge or left end of the machine as seen in FIG. 1 and be conveyed away on shackle members 18.

After the tool assemblies 72 are retracted, the drive cam assembly 78 moves the table assembly 70 back toward Position 1 while the tool assemblies 72 are maintained in their retracted positions. When the table assembly reaches Position 1, the next series of birds become aligned with the tool assemblies 72 and the process is repeated.

We claim:

1. Poultry eviscerating apparatus for removing viscera from within the body cavity of poultry through an access opening at the rear end of the poultry comprising:
   a. means for selectively moving the poultry along a prescribed path;
   b. a vacuum operated eviscerating tool assembly having an operating end;
   c. carriage means for selectively moving the operating end of said eviscerating tool means through the access opening of the poultry into the body cavity to a position so that the operating end of the eviscerating tool means overlies the viscera to be removed from within the body cavity with the tool assembly projecting through the access opening;
   d. vacuum means for selectively imposing a vacuum within the body cavity through the operating end of said eviscerating tool means while the operating end of the eviscerating tool means overlies the viscera; and,
   e. muffler means for introducing ambient air therethrough into the body cavity while preventing admission of ambient air into the body cavity without passage through said muffler means to limit the operating noise of the apparatus to a prescribed level.

2. The poultry eviscerating apparatus of claim 1 wherein said muffler means is mounted by said eviscerating tool assembly.

3. The poultry eviscerating apparatus of claim 1 wherein said muffler means includes a muffler mounted within said eviscerating tool assembly for introducing ambient air from a position exteriorly of the body cavity into the body cavity and sealing means carried by said eviscerating tool assembly for selectively sealing the access opening about said eviscerating tool assembly when the operating end of said tool assembly overlies the viscera to be removed from within the body cavity.

4. Poultry eviscerating apparatus for removing viscera from within the body cavity of poultry through an access opening at the rear end of the poultry comprising:
 a. means for selectively moving the poultry along a prescribed path;
 b. vacuum operated eviscerating tool means having an operating end;
 c. carriage means for selectively moving the operating end of said eviscerating tool means through the access opening of the poultry into the body caity to a position so that the operating end of the eviscerating tool means overlies the viscera to be removed from within the body cavity with the vacuum operated eviscerating tool means projecting out through the access opening;
 d. vacuum means for selectively imposing a vacuum within the body cavity through the operating end of said eviscerating tool means while the operating end of the eviscerating tool means overlies the viscera;
 e. sealing means for selectively sealing the access opening about said eviscerating tool means to prevent admission of ambient air in the vicinity of the access opening through the access opening into the body cavity when the vacuum is imposed in the body cavity; and,
 f. air intake means for introducing ambient air into the body cavity of the poultry from a position remote to the access opening to reduce the noise level of the operation of the eviscerating apparatus.

5. Poultry eviscerating apparatus for removing viscera from within the body cavity of poultry through an access opening at the rear end of the poultry comprising:
 a. conveying and positioning means for successively moving poultry along a prescribed path while maintaining the poultry in a prescribed position;
 b. a plurality of vacuum operated eviscerating tool assemblies, each of said eviscerating tool assemblies having an operating end adapted to project into the body cavity of the poultry and an opposite rear end, each of said tool asseblies comprising:
  an intake support tube extending from the operating end of said tool assembly to the rear end thereof;
  a vacuum nozzle assembly mounted on said intake support tube at the operating end of said tool assembly and adapted to selectively overlie the viscera to be removed from the body cavity, said intake support tube defining an air intake passage therethrough having an air outlet opening about said vacuum nozzle assembly and an air intake opening remote to the operating end of said tool assembly, said vacuum nozzle assembly defining an open mouth therein adapted to overlie the viscera to be removed;
  a vacuum interconnect tube within said air intake passage, said vacuum interconnect tube defining a vacuum passage therethrough communicating with said open mouth of said vacuum nozzle assembly, said vacuum passage having a discharge opening therefrom exteriorly of said air intake support tube so that a vacuum can be imposed on said open mouth of said vacuum nozzle assembly through said vacuum passage and said discharge opening independently of said air intake passages; and,
  sealing means carried by said intake support tube adjacent the operating end of said vacuum tool assembly for selectively sealing the access opening to the body cavity of the poultry when said vacuum nozzle assembly overlies the viscera in the body cavity to be removed;
 c. carriage means for selectively moving the operating end of one of said vacuum tube assemblies through the access opening of the poultry carried by said conveying and positioning means so that said vacuum nozzle assembly of said vacuum tool assembly overlies the viscera in the body cavity to be removed with said intake support tube projecting out of the body cavity through the access opening;
 d. vacuum means for selectively imposing a vacuum; and,
 e. connection means for selectively connecting said discharge opening in said vacuum interconnect tube to said vacuum source when said vacuum nozzle assembly overlies the viscera to be removed to impose a vacuum on the open mouth of said vacuum nozzle assembly and draw air through said intake tube into said body cavity and out of said body cavity through said vacuum nozzle assembly and said vacuum interconnect tube to dislodge and remove the viscera.

6. The poultry eviscerating apparatus of claim 5 wherein said sealing means includes a sealing ring slidably mounted on said intake support tube adjacent the operating end of said tool assembly and spring means for resiliently urging said sealing ring along said intake support tube toward the operating end of said tool assembly to cause said sealing ring to engage the poultry about the access opening in sealing engagement therewith when the operating end of said tool assembly projects into the body cavity of the poultry.

7. The poultry eviscerating apparatus of claim 5 wherein said vacuum interconnect tube has a diameter smaller than the diameter of said air intake passage through said intake support tube and extends across said air intake passage to deflect air flowing through said air intake passage.

8. A method of removing viscera from within the body cavity of the poultry through a preformed access opening at the rear end of the poultry comprising the steps of:
 a. inserting the open mouth of a vacuum operated eviscerating tool through the access opening in the bird into the body cavity so that the open mouth in the eviscerating tool overlies the viscera to be removed;
 b. sealing the access opening about the eviscerating tool;
 c. imposing a vacuum through the eviscerating tool on the open mouth to draw air into the open mouth in the eviscerating tool; and,
 d. introducing air from outside the poultry into the body cavity in the vicinity of the open mouth of the eviscerating tool so that the air from outside the poultry will be drawn into the open mouth in the eviscerating tool to dislodge the viscera to be removed and withdraw the viscera through the eviscerating tool.

9. The method of claim 8 wherein the step of imposing a vacuum on the open mouth in the eviscerating tool includes imposing a vacuum through a first passage in the eviscerating tool and wherein the step of introducing air from outside the body cavity into the body cavity includes introducing air through a second passage within the eviscerating tool.

10. The method of claim 8 wherein the step of introducing air into the body cavity from outside the poultry includes passing the air through muffling means to reduce the noise level associated with the operation thereof.

11. The poultry eviscerating apparatus of claim 1 further including protector means for selectively covering that portion of the inside of the body cavity of the bird over which the operating end of said eviscerating tool assembly passes during movement into and out of the body cavity to prevent inadvertent removal of the body parts of the poultry other than the viscera desired to be removed by said eviscerating tool assembly.

12. The poultry eviscerating apparatus as set forth in claim 11 wherein said protector member has a shape adapted to conform to the inside shape of that portion of the body cavity of the poultry against which said protector member extends.

13. The poultry eviscerating apparatus of claim 12 wherein said protector member is flexible.

14. The method of claim 8 further incuding the step of selectively covering a portion of the inside of the body cavity while leaving the selected viscera to be removed exposed during the time the operating end of the eviscerating tool is within the body cavity.

15. The method of claim 14 wherein the step of selectively covering the inside of the body cavity includes covering that portion of the inside of the body cavity adjacent the backbone between the lung cavities and the access opening.

16. The method of claim 15 wherein the step of passing the eviscerating tool into the body cavity includes causing the tool to overlie the lung cavities.

17. Poultry eviscerating apparatus for removing viscera from the body cavity of poultry through an access opening at the vent of the poultry including:
an eviscerating tool;
carriage means for selectively moving said eviscerating tool along a predetermined path;
positioning means for positioning the poultry with respect to said tool so that said tool passes into the body cavity of the poultry through the access opening to overlie the viscera to be removed by said tool; and,
protector means for selectively covering that portion of the inside of the body cavity of the poultry over which said eviscerating tool passes along said predetermined path to prevent inadvertent removal of body parts of the poultry other than the viscera desired to be removed by said eviscerating tool.

18. The poultry eviscerating apparatus as set forth in claim 17 wherein said protector member has a shape adapted to conform to the inside shape of that portion of the body cavity of the poultry against which said protector member extends.

19. The poultry eviscerating apparatus of claim 18 wherein said positioning means is constructed and arranged to force said protector member against the inside of the body cavity.

20. The poultry eviscerating apparatus of claim 17 wherein said protector member includes a cavity cover portion having a shape conforming generally to the shape of a selected portion of the inside of the body cavity of the poultry and insertable into the body cavity through the access opening to overlie said selected portion of the inside of the body cavity along the backbone.

21. The poultry eviscerating apparatus of claim 20 wherein said protector member further includes a leg portion at one end of said cavity cover portion adapted to overlie the rear end of the poultry adjacent the access opening.

22. The poultry eviscerating apparatus of claim 20 wherein said cavity cover portion is flexible to conform to the shape said selected portion of of the inside of the body cavity.

23. A method of removing selected organs of the viscera from the body cavity of poultry through an access opening to the body cavity at the vent comprising the steps of:
selectively covering a portion of the inside of the body cavity while leaving the selected organs to be removed exposed;
passing a processing tool into the body cavity over the covered portion of the body cavity until the processing tool overlies the exposed selected organ to be removed; and,
manipulating the processing tool to remove the exposed selected organ from the body cavity.

24. The method of claim 23 wherein the step of selectively covering the body cavity includes covering that portion of the inside of the body cavity adjacent the backbone between the lung cavities and the access opening.

25. The method of claim 24 wherein the step of passing the processing tool into the body cavity includes causing the tool to overlie the lung cavities and wherein the step of manipulating the tool includes imposing a vacuum through the tool onto the lungs in the lung cavities to withdraw same.

* * * * *